United States Patent Office 3,532,507
Patented Oct. 6, 1970

3,532,507
PROCESS FOR OBTAINING A STEAM AROMA FROM ROASTED AND GROUND COFFEE
Alexander S. Cascione, Yonkers, N.Y., assignor to General Foods Corporation, White Plains, N.Y., a corporation of Delaware
No Drawing. Filed Oct. 9, 1967, Ser. No. 673,972
Int. Cl. A23f 1/08
U.S. Cl. 99—71                              9 Claims

ABSTRACT OF THE DISCLOSURE

A steam aroma of improved flavor is obtained by pre-wetting a charge of roasted and ground coffee with 5–40% by weight water of the entire coffee charge, said water being added uniformly to the surface of the coffee particles in at least the bottom ¼ to ⅔ portion of said coffee charge to increase the moisture content of said coffee charge to increase the moisture content of said portion from 3–7% to between 10–55%, and then steaming said charge of coffee to release desirable volatile steam aromas which can be combined with at least a portion of the extract obtained from the steamed coffee.

BACKGROUND OF THE INVENTION

This invention relates to an improvement in the art of obtaining an atmospheric steam aroma from roasted and ground coffee and, more particularly, relates to an improvement over the prior art steam aroma patents of Nutting 2,562,206; Mahlmann 3,132,947; Clinton et al. 3,244,521 and British Pat. 246, 454.

The Nutting patent describes atmospheric steaming of a bed of roasted and ground coffee to obtain a flavorful aroma which can be added to coffee extract prior to spray-drying, thereby obtaining a more robust brew of instant coffee. The Mahlmann patent relates to an improvement on Nutting in that conditions are recited for obtaining a reflux and rectification of the steam aroma in the coffee bed during the steaming process. Clinton et al. relates to pre-wetting the bed of roasted and ground coffee in the upper one-third portion of the coffee bed in order to obtain a more highly concentrated steam aroma. Finally, the British patent indicates that addition of 1–5% moisture to an entire charge of coffee is old. However, in the course of adding these aromas to coffee extract which is dried (either by spray-drying or freeze-drying), it has been found that a majority of consumers object to the strong, overly robust notes of these aromas.

It is, therefore, the purpose of this invention to obtain a relatively milder steam aroma which can be added to extract, either before or after drying, to obtain a more desirable enhancement of the coffee brew.

It is, also, another purpose of this invention to avoid excessive degradation of the base coffee flavor due to the prolonged steaming time necessary in order to obtain a desirable steam aroma. This steaming time could range from several minutes to as long as 30–40 minutes and could seriously hurt the extractable coffee flavor still present in the coffee solids.

SUMMARY OF THE INVENTION

It has now been discovered that an improved volatile steam-distilled aroma can be obtained by a process which comprises pre-wetting a charge of roasted and ground coffee with 5–40% by weight water based on the weight of the entire coffee charge, said water being added uniformly to the surface of the coffee particles in at least the bottom ¼ to ⅔ portion of the coffee charge to increase the moisture level in said portion from 3–7% to between 10% and 55%, steaming said charge of coffee to release volatile aromas under at least atmospheric pressure conditions, extracting the dearomatized coffee solids, and then combining the released volatile aromas with at least a portion of the coffee extract. Only the bottom ¼ to ½ portion of the charge need be wet to obtain the improved results, although it is preferable to wet the entire bottom ½ portion.

DETAILED DESCRIPTION OF THE INVENTION

The charge of coffee usually takes the form of an elongated bed which has a height at least 5 times its width. This is normally the dimension of commercial percolator columns used for extraction of coffee, and the steaming operation can thus be accomplished in the same column prior to extraction.

It is only necessary to pre-wet the bottom portion of the bed prior to steaming. Ordinary tap water, coffee extract, or other aqueous liquid can be used to moisten the coffee particles, preferably to a level of 15–40% moisture. This moisture should be applied as a uniform coating to the surfaces of the ground coffee as it enters the percolator chamber so that the increase in moisture is present chiefly as surface moisture. This can be done by nozzles arranged around the percolator opening which can wet the coffee as it enters the chamber or the coffee can be pre-wet prior to this by passing the coffee through a wetting zone. The upper portion of the coffee charge can then be added to the pre-wet coffee, the coffee bed and chamber purged of oxygen (to below 1%) by passing inert gas through the bed, and then steamed under atmospheric or above atmospheric steam conditions.

The coffee may be steamed by the Mahlmann technique to obtain a volatile aroma fraction due to condensation of the aromas, these aromas then being added to extract obtained from the dearomatized coffee solids. Preferably, the aromas can be added to a minor portion of the extract charge (10–20%) and freeze-dried while the remainder (90–80%) is spray-dried, and the two extracts then blended to give a desirable aromatized soluble coffee. However, the aromas can be added to 100% of the extract and then freeze-dried or spray-dried to obtain a superior product over normal spray-dried coffee.

The pre-wetting of coffee also serves a useful purpose in commercial processing when the coffee is introduced into the extraction columns. The column walls are normally quite hot as a result of processing of prior batches of coffee, and if coffee is placed in the hot column, the heat will degrade many of the desirable aromatics in the coffee and will prevent desirable condensation and revolatilization of the steam vapors containing the aromatics. It is highly desirable to have such condensation and revaporization take place within the column if a steam distilled aroma having desired properties is to be obtained.

While it is possible in carrying out the pre-wetting step of the present invention to employ water at any temperature below about 200° F. and preferably 32° F. to 120° F., it is preferred to employ water temperatures within the range of 50° to 80° F. to avoid degradation of the desirable aromatic constituents while at the same time obtaining a steaming operation which is most feasible from an economic standpoint. At temperatures above 120° F. the flavor of the coffee may be hurt while temperatures below 50° F. require considerably more heat to be injected into the system in order to obtain the desirable aroma volatiles.

The low temperature in the bottom portion of the charge of coffee resulting from the pre-wetting step permits a lower temperature profile to exist during the steaming operation and, thus, effectively prevents degradation of the base coffee flavor still remaining in this coffee and which is not releasable in the steaming operation. By this technique, the product temperature in this portion of the coffee bed is kept at a maximum 212° F. due to the ground coffee being surface-wet. In conventional steaming operations, the steam entering the bottom of the coffee charge at pressures of 5–30 p.s.i.g. will almost immediately raise the temperature of this portion of the coffee to about 230° F. to 250° F. and this high temperature will be retained for the remainder of the steaming operation causing severe degradation of the base coffee flavor. On the other hand, the upper portion of the coffee bed need not be pre-wet and, in fact, is preferably not pre-wet since the temperatures in this portion of the charge of coffee usually does not exceed 212° F. to a substantial extent during the distillation operation.

PREFERRED EMBODIMENTS OF THE INVENTION

This invention will now be described by reference to several specific examples.

EXAMPLE 1

About 200 lbs. of roasted and ground coffee having a particle size distribution of between 10 and 80 mesh U.S. Standard Sieve Screen (90% retained on 40 mesh) was introduced into a conventional coffee percolator column about 15' in height and 12" in diameter. About 40 lbs. of water at 75° F. was added to 100 lbs. of this coffee as it entered the column. This was done by spraying the water uniformly from a perforated annular pipe on all surfaces of the coffee particles as the particles are dropped by gravity in an annular curtain inside said pipe. The upper one-half portion of coffee was not pre-wet. The coffee bed was purged by passing inert gas (nitrogen) through the bed from the bottom of the percolator until the vent gas from the top of the bed measured less than 1% oxygen. Steam at a pressure of 20 p.s.i. and a flow rate of about 100 lbs./hour was then introduced into the bottom of the perculator for 20 minutes and permitted to pass through the column while maintaining a pressure of 20 p.s.i. in the column. The vapors passing from the column during the last 10 minutes of steaming were collected in a condenser at 35°–50° F. under a carbon dioxide atmosphere and 1200 centimeters of steam-distilled aroma was obtained. The dearomatized coffee solids were then extracted in a conventional percolator train and the collected aromas were then added back to the extract. The aroma-extract mixture was co-dried by spray-drying to obtain a soluble coffee of improved coffee flavor over conventional spray-dried coffee. The flavor enhancement, while in the direction of fresh roasted and ground coffee, was not as harsh as with the steam aromas obtained from coffee which was not pre-wet in the bottom portion of the bed.

EXAMPLE 2

The process of Example 1 was followed with the exception that the aromatized extract was freeze-dried instead of being spray-dried. The enhancement here was more evident than in the spray-dried product of Example 1 but was still milder than control samples which were freeze-dried with steam aromas of the Mahlmann and Clinton et al. type.

EXAMPLE 3

The process of Example 1 was followed with the exception that the aromas were added to 20% of the dearomatized extract steam, the extract frozen, ground and freeze-dried. The aromatized freeze-dried coffee was then blended with the remaining 80% of the extract steam which was spray-dried. This gave a product very close to the Example 2 product in taste and aroma upon reconstitution.

Reference may now be made to the appended claims to determine the true scope of this invention.

What is claimed is:

1. A process for producing volatile coffee aromas of improved flavor during steam distillation which comprises prewetting a charge of roasted and ground coffee with 5–40% by weight water based on the weight of the entire coffee charge, said water being added uniformly to the surface of the coffee particles in only the bottom ¼ to ⅔ of said coffee charge to increase the moisture content in said portion from 3–7% to 10–55%, using an aqueous liquid as a prewetting agent, thereafter introducing steam into the bottom of said charge of coffee, steaming said charge of coffee to release volatile aromas under at least atmospheric conditions, collecting the released volatile aromas, extracting the dearomatized coffee solids drawing off a coffee extract, and then combining the released aromas with at least a portion of the coffee extract.

2. The process of claim 1 wherein the coffee is prewet with coffee extract to increase the moisture content of said coffee.

3. The process of claim 1 wherein the moisture content of the prewet coffee is increased to between 15% to 40%.

4. The process of claim 3 wherein the charge of coffee is purged by passing an inert gas through said charge of coffee to reduce the oxygen content to less than 1%.

5. The process of claim 4 wherein the charge of coffee is in the form of an elongated bed having a height at least 5 times its width.

6. The process of claim 5 wherein the bottom ½ portion of the coffee charge is prewet.

7. The process of claim 6 wherein the volatile aromas which are released are collected by condensation and are then added to the dearomatized extract prior to drying and the extract is dried.

8. The process of claim 7 wherein the condensed aromas are added to a minor portion of the coffee extract, said aromatized extract then being freeze-dried, the major portion of extract being spray-dried, and the dried extracts then being combined.

9. The process of claim 8 wherein the minor portion of extract is between 10–20% and the major portion of extract is between 80–90%.

References Cited

UNITED STATES PATENTS

| 2,562,206 | 7/1951 | Nutting | 99—71 |
| 3,092,498 | 6/1963 | White | 99—71 |
| 3,132,947 | 5/1964 | Mahlmann | 99—71 |
| 3,244,531 | 5/1966 | Clinton | 99—71 |

FOREIGN PATENTS 246,454  10/1926  Great Britain.

FRANK W. LUTTER, Primary Examiner

W. L. MENTLIK, Assistant Examiner